(12) United States Patent
Takehara et al.

(10) Patent No.: US 9,360,903 B2
(45) Date of Patent: Jun. 7, 2016

(54) SYSTEM FOR CONTROLLING ELECTRIC POWER SUPPLY TO DEVICES

(75) Inventors: Kiyotaka Takehara, Nara (JP); Yasuhiro Yanagi, Osaka (JP); Akiko Takamiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 895 days.

(21) Appl. No.: 13/496,045

(22) PCT Filed: Aug. 30, 2010

(86) PCT No.: PCT/IB2010/002123
§ 371 (c)(1), (2), (4) Date: Apr. 26, 2012

(87) PCT Pub. No.: WO2011/033351
PCT Pub. Date: Mar. 24, 2011

(65) Prior Publication Data
US 2012/0205975 A1 Aug. 16, 2012

(30) Foreign Application Priority Data

Sep. 15, 2009 (JP) ................. 2009-213502

(51) Int. Cl.
*H02J 1/10* (2006.01)
*G06F 1/18* (2006.01)
(Continued)

(52) U.S. Cl.
CPC ............. *G06F 1/189* (2013.01); *G06F 1/263* (2013.01); *H02J 3/005* (2013.01); *H02J 3/14* (2013.01); *H02J 3/32* (2013.01); *H02J 3/383* (2013.01); *H02J 2003/143* (2013.01); *Y02B 70/3225* (2013.01); *Y02B 70/3266* (2013.01); *Y02E 10/563* (2013.01); *Y02E 10/566* (2013.01); *Y04S 20/222* (2013.01); *Y04S 20/242* (2013.01); *Y10T 307/344* (2015.04); *Y10T 307/352* (2015.04)

(58) Field of Classification Search
CPC ........... Y02E 10/50; H02J 3/383; H02J 3/382
See application file for complete search history.

(56) References Cited

U.S. PATENT DOCUMENTS 4,551,980 A * 11/1985 Bronicki ................... 60/698
5,909,061 A * 6/1999 Sasaki .................. F24F 5/0046
307/44

(Continued)

FOREIGN PATENT DOCUMENTS

CN 1579041 A 2/2005
CN 1759516 A 4/2006
(Continued)

OTHER PUBLICATIONS

The International Search Report for PCT/IB2010/002123.
European Search Report dated Dec. 2, 2013.
Chinese Office Action dated Oct. 21, 2013 and English summary thereof.
The Japanese Office Action dated Jan. 8, 2013 and the English Summary thereof.

*Primary Examiner* — Thienvu Tran
*Assistant Examiner* — David M Stables
(74) *Attorney, Agent, or Firm* — Bacon & Thomas, PLLC (57) ABSTRACT

A system for controlling an electric power supply to devices is provided. The system includes a plurality of power supply sources, devices operated by an electric power, and a control part that determines the power supply source to be used for supplying the electric power to the devices. Further, the control part controls the amount of electric power to be supplied to the devices by the determined power supply source.

16 Claims, 2 Drawing Sheets

(51) Int. Cl.
*G06F 1/26* (2006.01)
*H02J 3/00* (2006.01)
*H02J 3/14* (2006.01)
H02J 3/38 (2006.01)
H02J 3/32 (2006.01)

(56) References Cited

U.S. PATENT DOCUMENTS

2004/0201282 A1 10/2004 Kado et al.
2008/0046387 A1* 2/2008 Gopal et al. .................. 705/412
2008/0052145 A1* 2/2008 Kaplan .............. G06Q 10/0631
　　　　　　　　　　　　　　　　　　　　　　705/7.12
2009/0152947 A1* 6/2009 Wang ....................... H02J 1/14
　　　　　　　　　　　　　　　　　　　　　　307/24

FOREIGN PATENT DOCUMENTS

| DE | 19850565 A | 5/2000 |
| EP | 1777793 A | 4/2007 |
| JP | S59109767 | 8/1981 |
| JP | S59-109767 U | 7/1984 |
| JP | H8186935 | 7/1996 |
| JP | H10198465 | 7/1998 |
| JP | 2003189477 | 7/2003 |
| JP | 2007020260 | 1/2007 |
| JP | 2009178025 | 8/2009 |

* cited by examiner

SYSTEM FOR CONTROLLING ELECTRIC POWER SUPPLY TO DEVICES

FIELD OF THE INVENTION

The present invention relates to a, system for controlling an electric power supply to devices.

BACKGROUND OF THE INVENTION

Alternating Current (AC) devices, such as an air conditioner, a refrigerator and a washing machine, are driven by a commercial electric power (AC power), and Direct Current (DC) devices, such as a personal computer, a Liquid Crystal Display (LCD) television, a telephone and a facsimile, are driven by a DC power. In this regard, there is proposed a technology that operates in parallel an AC power distribution system for supplying an AC power and a DC power distribution system for supplying a DC power in a house or a shop (see, for example, Japanese Patent Application Publication No. 2009-178025).

In household power distribution systems, a commercial power source, solar cells and a secondary battery charged with a surplus power are commonly used as power supply sources which supply powers to devices. Furthermore, the power supply source(s) that supplies the power to the devices is switched based on an amount of power supplied and an amount of power required.

For example, while the power charged in the secondary battery or the power generated by the solar cells is sufficient, the power charged in the secondary battery or the power generated by the solar cells is not only supplied to the DC devices, but is also converted into an AC power using an inverter and supplied to the AC devices. Furthermore, when the power charged in the secondary battery or the power generated by the solar cells is insufficient, the power supplied by the commercial power source is not only additionally used and supplied to the AC devices, but is also converted into a DC power using a converter and supplied to the DC devices.

However, although the power supply source(s) which supplies the power to the devices is switched depending on the amount of the power supplied by the power supply source(s) and the amount of the power required by the devices, the operations of the devices are kept constant regardless of the switching of the power supply sources. Therefore, it is unable to perform an efficient power saving control in which the operations of the power supply sources are carried out in association with the operations of the devices.

SUMMARY OF THE INVENTION

In view of the above, the present invention provides a system for controlling an electric power supply to devices which can efficiently perform a power saving control on the operation of devices in conjunction with switching power supply sources which supply a power to the devices.

In accordance with an aspect of the present invention, there is provided a system for controlling an electric power supply to devices including: a plurality of power supply sources; one or more devices which is driven by an electric power; and a control part which determines a power supply source for each of the devices and controls an amount of the power to be supplied to the devices based on the determined power supply source.

The power supply sources may include a commercial power source, a distributed power source, and a secondary battery which is charged by at least one of the commercial power source and the distributed power source, the devices being driven by the power supplied from the power supply sources, wherein the control part includes: a power distribution control unit which performs a power distribution control by determining a power supply source for each of the devices based on at least one of an amount of the power supplied from the power supply sources and an amount of the power demanded by the devices and switching the power supply sources based on a result of the determination; and a power saving control unit which performs a power saving control in accordance with the power supply source determined by the power distribution control unit, so that a power consumption of the corresponding device can be reduced.

With such configuration, it is possible to perform the efficient power saving control of the devices in conjunction with the switching of the power supply sources.

The power distribution control unit may perform one of power distribution control modes in which the power is supplied to the devices from the different power supply sources; and the power saving control unit performs one of power saving control patterns having different power consumptions, based on the power distribution control mode performed by the power distribution control unit.

With this configuration, a power distribution control can be appropriately performed by switching over the mode based on the amount of power supplied by the power supply source and the amount of power required. Further, the power saving control of the devices can be appropriately performed in accordance with the mode of the power distribution control unit.

The power distribution control unit may perform one of the power distribution control modes comprising a mode using the commercial power source and a mode using a power supply source other than the commercial power source, wherein, when the power distribution control unit operates in the mode using the power supply source including the commercial power source, the power saving control unit reduces the power consumption by a large amount, compared to when the power distribution control unit operates in the mode using the power supply source other than the commercial power source.

Accordingly, the power distribution control can be appropriately performed by switching over the mode depending on whether or not the commercial power source is used as the power supply source. Further, the power saving control of the devices can be appropriately performed in accordance with the mode of the power distribution control unit.

The distributed power source may include solar cells, wherein the power distribution control unit performs one of the power distribution control modes comprising a mode using only the solar cells, a mode using the solar cells and the secondary battery, and the mode using the commercial power source; and the power saving control unit reduces the power consumption by a larger amount when the power distribution control unit operates in the mode using the power supply source including the commercial power source, than when the power distribution control unit operates in the mode using the solar cells and the secondary battery, and reduces the power consumption by a larger amount when the power distribution control unit operates in the mode using the solar cells and the secondary battery, than when the power distribution control unit operates in the mode using only the solar cells.

With such configuration, when the amount of power supplied by the solar cells or secondary battery decreases and a use of the commercial power source increases, the power saving control of the devices is performed. Therefore, it is possible to suppress the power consumption of the commercial power source, thereby reducing the electricity expenses.

The power distribution control unit may perform one of the power distribution control modes including a first mode using only the solar cells, a second mode using the solar cells and the secondary battery, a third mode using the solar cells, the secondary battery and the commercial power source, a fourth mode using the solar cells and the commercial power source, and a fifth mode using only the commercial power source; and the power saving control unit does not perform the power saving control when the power distribution control unit operates in the first mode, sets an amount of a reduction in the power consumption to a maximum value when the power distribution control unit operates in the fifth mode, and sets an amount of the reduction in the power consumption to a value larger than 0 and smaller than the maximum value when the power distribution control unit operates in the second, third or fourth mode.

With such configuration, the states of the use of the commercial power source, the solar cells and the secondary battery are further subdivided, and the power saving control of the devices is performed when the use of the commercial power source increases due to a decrease in the amount of power supplied by the solar cells or secondary battery. As a result, it is possible to suppress the power consumption of the commercial power source, thereby reducing the electricity expenses.

The control part may further include a manipulation unit for allowing a user to set one of the power saving control patterns to be performed by the power saving control unit; and the power saving control unit sets the power saving control pattern in association with each of the power distribution control modes of the power distribution control unit, based on the intensity of the power saving control set by the user.

Accordingly, since the control pattern of the devices is changed based on the power saving control pattern set by a user, it is possible to save the power and also maintain the user's comfort while respecting the user's intension.

The commercial power source may have unit electricity prices varying depending on time zones; and, when the power distribution control unit operates in a mode using the commercial power source, the power saving control unit changes the power saving control pattern to be performed based on the unit electricity price of the commercial power source at current time zone.

With such configuration, the power saving control pattern varies depending on the electricity prices of the time zones, thereby saving power and reducing electricity bill.

The power saving control unit may change the power consumption to be reduced by the power saving control, before the power supply sources are switched.

By doing so, it is possible to prevent the use of power from exceeding the amount of the power supplied from the power supply source and also prevent the mode switching operation from chattering.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Embodiments of the present invention will be described in detail below with reference to the accompanying drawings which form a part hereof. The same reference numerals will be assigned to the same or similar components throughout the drawings, and redundant descriptions thereof will be omitted.

An embodiment of the present invention will now be described based on the drawings.

(First Embodiment)

Figure 1:
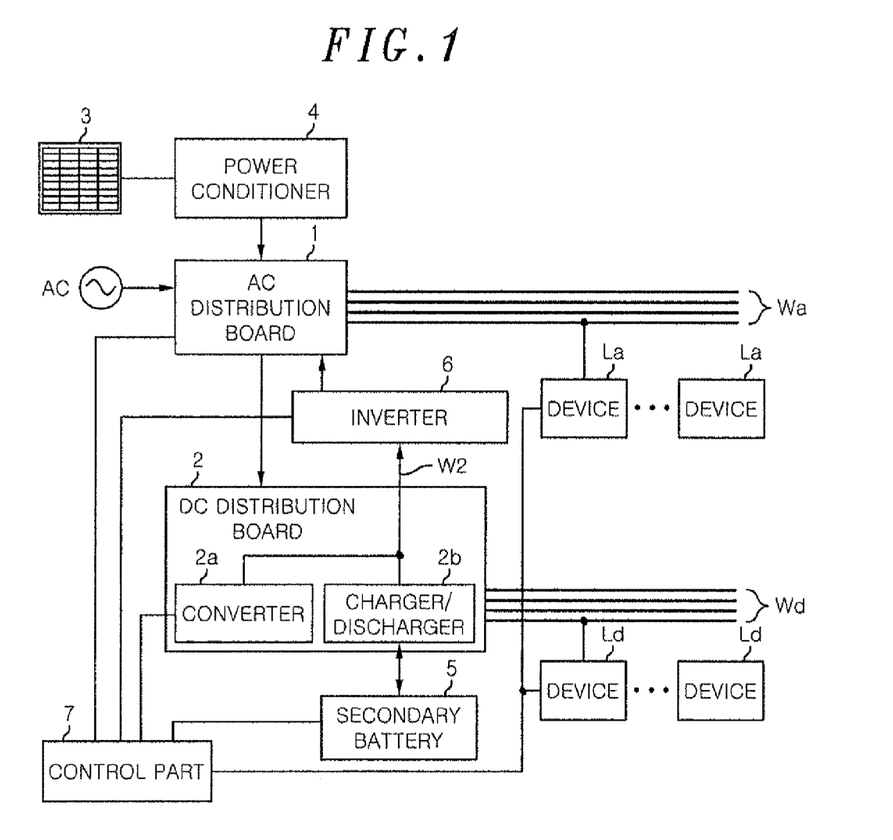
FIG. 1 is a diagram illustrating the entire configuration of a system for controlling an electric power supply to devices, in accordance with an embodiment of the present invention.

Referring to FIG. 1, there is illustrated a system for controlling an electric power supply to devices (hereinafter, referred to as a "power supply control system") in accordance with the embodiment of the present invention which is used chiefly in houses. The power supply control system is applied to a power supply system, and includes an AC distribution board 1 to which AC power supply lines Wa supplying a power to AC devices La driven by an AC power are connected; and a DC distribution board 2 to which DC power supply lines Wd supplying a power to DC devices Ld driven by a DC power are connected. As for the power supply sources of the system, a commercial power source AC is used as an AC power supply source, and solar cells 3 and/or a secondary battery 5 are used as a DC power supply source.

The AC distribution board 1 to which the AC power supply lines Wa are connected is supplied with the AC power from the commercial power source AC, and from the solar cells 3 as a distributed power source via a power conditioner 4 (first power conversion means). Further, the AC distribution board 1 includes a main breaker, branch breakers and a switch (not shown) thereon, and supplies an AC power to an AC connection line W1 and the AC power supply lines Wa branched into systems at a load side of the branch breakers. Furthermore, the power conditioner 4 has the functions of converting a DC power generated by the solar cells 3 into an AC power and adjusting an output frequency and voltage to enable grid connection with the commercial power source AC.

Meanwhile, the DC distribution board 2 to which the DC power supply lines Wd are connected is supplied with an AC power from the AC distribution board 1 via the AC connection line W1. Further, the DC distribution board 2 includes a converter 2a (second power conversion means) that converts the AC power into a DC power of a desired voltage. The converter 2a serves as an AC-DC conversion device. An output of the converter 2a is supplied to the DC power supply lines Wd of multiple systems via circuit protectors and a switch (not shown) which are built in the DC distribution board 2.

In the DC distribution board 2, a charger/discharger 2b is connected between an output terminal of the converter 2a and the secondary battery 5, and charge and discharge the secondary battery 5. In charging by the charger/discharger 2b, the secondary battery 5 is charged with a surplus power of the DC power supplied to the DC power supply line Wd from the converter 2a. Furthermore, an output voltage from the secondary battery 5 is adjusted by the charger/discharger 2b, and the power from the secondary battery 5 is supplied to the DC power supply lines Wd along with a DC power outputted from the converter 2a.

As described above, the DC power outputted from the converter 2a and the secondary battery 5 is supplied to an inverter 6 (second power conversion means) via a DC connection line W2. The inverter 6 serves as a DC-AC conversion device which adjusts an output frequency and voltage to enable grid connection with the commercial power source AC. That is, the inverter 6 converts a DC power into an AC power, and supplies the AC power to the AC power supply lines Wa via the branch breakers in the AC distribution board 1.

As is apparent from the above description, an AC power can be supplied from the AC distribution board 1 to the DC distribution board 2, converted into a DC power by the converter 2a, and the DC power can be supplied to the DC power supply line Wd. Conversely, a DC power can be supplied from the DC distribution board 2 to the AC distribution board 1, converted into an AC power by the inverter 6, and the AC power can be supplied to the AC power supply line Wa.

In the power supply control system, the commercial power source AC serves as an AC power supply source, the solar cells 3 and the secondary battery 5 serve as DC power supply sources. A control part 7 includes a power distribution control unit 7b (power distribution control means for varying the ratio of the output among the power supply sources) which switches between the power supply sources to supply the devices L (the AC devices La and the DC devices Ld) with a power based on the amounts of the power supplied from the power supply sources.

Figure 2:
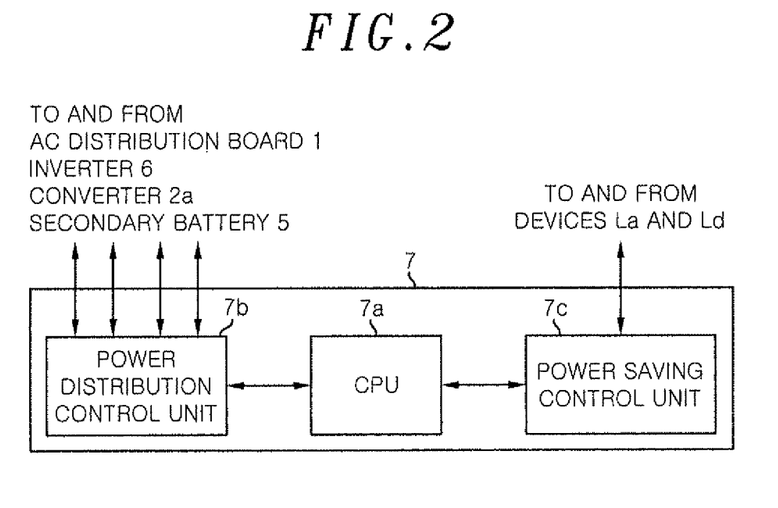
FIG. 2 is a block diagram illustrating configuration of a control part in the system in accordance with a first embodiment of the present invention.

Further, the control part 7 includes a power saving control unit 7c which performs a power saving control on the operation of the devices L according to the power supply source used to supply power, and a CPU 7a for controlling the operation of the power distribution control unit 7b and the power saving control unit 7c. Power distribution control and power saving control that are performed by the control part 7 will now be described.

The control part 7 monitors the power supplied from the commercial power source AC, the amount of the power generated by the solar cells 3, the charge level of the secondary battery 5, the AC power supplied from the AC distribution board 1 to the AC power supply line Wa, and the DC power supplied from the DC distribution board 2 to the DC power supply lines Wd. The power distribution control is performed by controlling the converter 2a, the charger/discharger 2b, the inverter 6 and the switches built in the AC distribution board 1 and the DC distribution board 2 based on the results of the monitoring and by controlling the supply of power between the AC distribution board 1 and the DC distribution board 2.

First, the secondary battery 5 is charged with the power generated by the solar cells 3 or supplied from the commercial power source AC, through the converter 2a and the charger/discharger 2b. Further, the control part 7 enters a first power surplus mode (first mode) when the charge level of the secondary battery 5 is 100% (full charge) and the amount of the power generated by the solar cells 3 is equal to or larger than 10% of rated power. Furthermore, when the charge level of the secondary battery 5 is equal to or higher than 80%, or when the charge level of the secondary battery 5 is equal to or higher than 30% and the amount of the power generated by the solar cells 3 is equal to or higher than 30% of the rated power, the control part 7 enters a second power surplus mode (second mode).

In the first power surplus mode, only the solar cells 3 are used as a power supply source. In this mode, the DC devices Ld on the DC power supply lines Wd are operated by the power generated by the solar cells 3 which is supplied via the power conditioner 4 and the converter 2a, while the AC devices La on the AC power supply lines Wa are operated by the power generated by the solar cells 3 which is supplied via the power conditioner 4. Herein, the solar cells 3 become a power supply source, and the amount of the power supplied from the commercial power source AC becomes zero.

In the second power surplus mode, the solar cells 3 and the secondary battery 5a are used as power supply sources. In this mode, the DC devices Ld on the DC power supply lines Wd are operated by the power charged in the secondary battery 5 and the power generated by the solar cells 3 which supplied via the power conditioner 4 and the converter 2a, while the AC devices La on the AC power supply lines Wa are operated by the power generated by the solar cells 3 which supplied via the power conditioner 4 and the power charged in the secondary battery 5 which supplied via the inverter 6. In this case, the DC power supply sources of the solar cells 3 and the secondary battery 5 becomes power supply sources, and the amount of the power supplied from the commercial power source AC becomes zero.

Further, the control part 7 enters a first commercial power source mode (third mode) when the charge level of the secondary battery 5 is equal to or higher than 30% and the amount of the power generated by the solar cells 3 is lower than 30% of the rated power. Furthermore, the control part 7 enters a second commercial power source mode (fourth mode) when the charge level of the secondary battery 5 is lower than 30% and the amount of the power generated by the solar cells 3 is equal to or higher than 30% of the rated power.

In the first commercial power source mode, the solar cells 3, the secondary battery 5 and the commercial power source AC are used as power supply sources. The DC devices Ld on the DC power supply lines Wd are operated by the power charged in the secondary battery 5, the power generated by the solar cells 3 which is supplied via the power conditioner 4 and the converter 2a, and the power supplied from the commercial power source AC via the converter 2a. Further, the AC devices La on the AC power supply lines Wa are operated by the power supplied from the commercial power source AC, the power generated by the solar cells 3 which is supplied via the power conditioner 4, and the power charged in the secondary battery 5 which is supplied via the inverter 6. In this case, the commercial power source AC, the solar cells 3, and the secondary battery 5 become power supply sources.

In the second commercial power source mode, the solar cells 5 and the commercial power source AC are used as power supply sources. The DC devices Ld on the DC power supply lines Wd are operated by the power generated by the solar cells 3 which is supplied via the power conditioner 4 and the converter 2a and the power supplied from the commercial power source AC via the converter 2a. Further, the AC devices La on the AC power supply lines Wa are operated by the power supplied from the commercial power source AC and the power generated by the solar cells 3 which is supplied through the power conditioner 4. In this case, the commercial power source AC and the solar cells 3 become power supply sources.

Further, when the power generated by the solar cells 3 and the charge level of the secondary battery 5 do not correspond to those of the first and second power surplus modes and the first and second commercial power source modes, the control part 7 enters a commercial power consumption mode (fifth mode) in which the AC devices La and the DC devices Ld are operated only by the power supplied from the commercial power source AC.

This commercial power consumption mode is subdivided into three modes: a first commercial power consumption mode for a time zone from 22:00 to 07:00 for which the unit electricity price is the cheapest, a second commercial power consumption mode for a time zone from 07:00 to 10:00 for which the unit electricity price is the second cheapest, and a third commercial power consumption mode for a time zone from 10:00 to 22:00 for which the unit electricity price is the most expensive. The mode is determined depending on the current time. In this case, only the commercial power source AC becomes a power supply source.

As described above, the control part 7 selects one from among the seven power distribution control modes (the first power surplus mode, the second power surplus mode, the first commercial power source mode, the second commercial power source mode, the first commercial power consumption mode, the second commercial power consumption mode, and the third commercial power consumption mode) depending on the amount of the power supplied from each power supply source. Further, the control part 7 sets a power saving control pattern for the AC devices La and the DC devices Ld based on the selected power distribution control mode. The power distribution control modes are not limited to the above seven modes. For example, there may be added a mode including a prediction about the amount of the power generated by the solar cells 3 based on weather or a weather forecast as a determination condition.

For example, in the case of an air conditioner, the power saving control patterns for the respective modes of the power distribution control are as follows:

First power surplus mode: normal operation, set temperature of 24° C.

Second power surplus mode: energy saving operation, set temperature of 25° C.

First commercial power source mode: energy saving operation, set temperature of 26° C.

Second commercial power source mode: energy saving operation, set temperature of 27° C.

First commercial power consumption mode: energy saving operation, set temperature of 28° C.

Second commercial power consumption mode: energy saving operation, set temperature of 28° C., and intermittent operation (e.g., 50 minutes operation and 10 minutes stop)

Third commercial power consumption mode: power off

Further, in the case of a lighting device, the power saving control patterns for the respective modes of the power distribution control are as follows:

First power surplus mode: normal operation, 100% lighting

Second power surplus mode: energy saving operation, 80% lighting

First commercial power source mode: energy saving operation, 70% lighting

Second commercial power source mode: energy saving operation, 60% lighting

First commercial power consumption mode: energy saving operation, 50% lighting

Second commercial power consumption mode: energy saving operation, 20% lighting

Third commercial power consumption mode: turning off the lights

That is the power distribution control is performed which switches between the power supply sources based on the amounts of the power supplied from the power supply sources. Further, the power saving control is performed on the operation of the devices L as the use of the commercial power source AC increases, according to the power supply source used to supply the power, thereby suppressing the power consumption of the commercial power source AC and achieving a reduction in electricity bills.

Furthermore, in the commercial power consumption mode, the power supplied to the AC devices La and the DC devices Ld is varied depending on the electricity price in each time zone, thereby achieving the saving of power and a reduction in electricity expenses. Here, the unit electricity prices in the first commercial power consumption mode, the second commercial power consumption mode and the third commercial power consumption mode are increased in that order.

In the present embodiment, the power supplied to the AC devices La and the DC devices Ld is reduced in the mode in which the unit electricity price is expensive, thereby achieving the saving of power and a reduction in the electricity bills. As described above, with the power supply control system of the present embodiment, it is possible to perform a power saving control of the AC devices La and the DC devices Ld in conjunction with the switching of the power supply sources used to supply the power.

Further, when the mode is switched, the control part 7 may switch an operation type of devices before switching the power supply sources. For example, when the mode is switched from the first power surplus mode to the second power surplus mode, the operation type of the devices is switched from the normal operation to the energy saving operation (80% lighting) and then (e.g., 10 minutes after) the power supply source is switched from only the solar cells 3 to a combination of the solar cells 3 and the secondary battery 5.

In this way, when the operation type of the devices L is switched, the power consumption of the devices L is changed. Further, the power supply source used to supply the power is switched after the power consumption of the devices L has been changed. This makes it possible to prevent the use of the power from exceeding the amount of the power supplied from the power supply source and prevent the mode switching operation from chattering.

Furthermore, in the present embodiment, the power distribution control of the power supply sources may be performed by switching between five modes including: first power surplus mode, second power surplus mode, first commercial power source mode, second commercial power source mode, and a commercial power consumption mode. In the above seven modes, the commercial power consumption mode is subdivided based on the unit electricity price.

Further, the first commercial power source mode and second commercial power source mode may be also subdivided based on the unit electricity price, like the first to third commercial power consumption modes. Alternatively, the power distribution control of the power supply sources may be performed by switching between three modes including: the power surplus mode using only the DC power supply source, the commercial power source mode using both the commercial power source AC and a DC power supply source, and the commercial power consumption mode using only the commercial power source AC. Each of the three modes may be subdivided into the seven modes.

Furthermore, the power distribution control of the power supply sources may be performed by switching between three modes including: a mode using only the solar cells 3, a mode using the solar cells 3 and the secondary battery 5, and a mode using power supply sources including the commercial power source AC. Alternatively, the power distribution control of the power supply sources may be performed by switching between two modes including: a mode using power supply sources including the commercial power source AC and a mode using power supply sources other than the commercial power source AC.

(Second Embodiment)

A power supply control system in accordance with a second embodiment of the present invention includes the components shown in FIG. 1, like that of the first embodiment. The same numerals will be assigned to the same components, and redundant descriptions thereof will be omitted.

Figure 3:
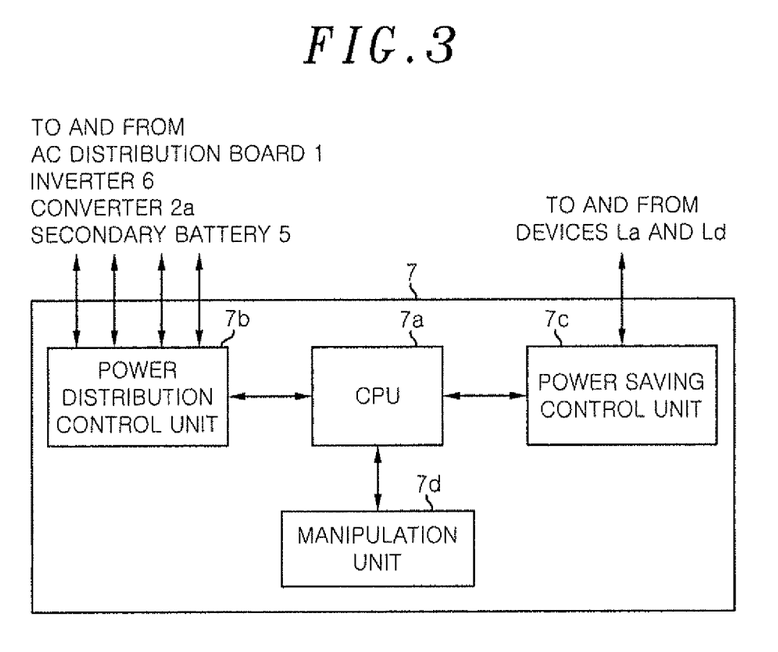
FIG. 3 is a block diagram illustrating configuration of a control part in accordance with a second embodiment of the present invention.

In the present embodiment, there is further provided a manipulation unit 7d which is manipulated by a user in the control part 7. An intensity of a power saving may be set using the manipulation unit 7d. For example, the intensity of the power saving (hereinafter, referred to as a "power saving intensity") is selected from among High, medium and Low. Here, the power saving intensity is not limited to the three steps, but may be, for example, two steps or four steps.

Further, the control part 7 performs a power saving control on the operation of the AC devices La and the DC devices Ld in the five power distribution control modes using different patterns for each power saving intensity.

In the case where the power saving intensity is "High," the power saving control patterns of the air conditioner are as follows:

first power surplus mode: energy saving operation, set temperature of 26° C.

second power surplus mode: energy saving operation, set temperature of 28° C.

first commercial power source mode: energy saving operation, set temperature of 28° C.

second commercial power source mode: energy saving operation, set temperature of 28° C.

first commercial power consumption mode: energy saving operation, set temperature of 28° C., and intermittent operation second commercial power consumption mode: power off third commercial power consumption mode: power off With such power saving control patterns, the highest power saving can be achieved.

In the case where the power saving intensity is "medium", the power saving control patterns of the air conditioner are as follows:

first power surplus mode: normal operation, set temperature of 24° C.

second power surplus mode: energy saving operation, set temperature of 25° C.

first commercial power source mode: energy saving operation, set temperature of 26° C.

second commercial power source mode: energy saving operation, set temperature of 27° C.

first commercial power consumption mode: energy saving operation, set temperature of 28° C.

second commercial power consumption mode: energy saving operation, set temperature of 28° C., and intermittent operation third commercial power consumption mode: power off With this power saving control patterns, the second highest power saving can be achieved.

In the case where the power saving intensity is "Low", the power saving control patterns of the air conditioner are as follows:

first power surplus mode: normal operation, set temperature of 24° C.

second power surplus mode: normal operation, set temperature of 24° C.

first commercial power source mode: energy saving operation, set temperature of 25° C.

second commercial power source mode: energy saving operation, set temperature of 25° C.

first commercial power consumption mode energy saving operation, set temperature of 26° C.

second commercial power consumption mode: energy saving operation, set temperature of 28° C.

third commercial power consumption mode: energy saving operation, set temperature of 28° C., and intermittent operation With such power saving control patterns, the devices are controlled so that the lowest power saving can be achieved.

As described above, based on the power saving intensity set by a user, a power saving control pattern corresponding to each of the power distribution control modes is set. This makes it possible to save power and also maintain the user's comfort while respecting the user's intension.

(Third Embodiment)

In the first and second embodiments, the control part 7 includes the power distribution control unit 7b which switches between the power supply source depending on the amount of the power supplied by each of the power supply sources. However, the power distribution control unit 7b may switch between the power supply sources depending on an amount of the power demanded by the devices.

In the present embodiment, the control part 7 determines an amount of the demanded power by monitoring the AC power supplied from the AC distribution board 1 to the AC power supply lines Wa and the DC power supplied from the DC distribution board 2 to the DC power supply line Wd, or by obtaining information on power consumption of the AC devices La and the DC devices Ld. When the amount of the demanded power is small, the solar cells 3 and the secondary battery 5 are used as power supply sources. Further, the commercial power source AC is additionally used as the amount of the demanded power increases, and the commercial power source AC is solely used as a power supply source when the amount of the demanded power becomes large.

Further, in the present embodiment, the variation in the power capacity of the solar cells 3 and the secondary battery 5 (the maximum and minimum values of the capacity of the power which can be supplied) attributable to the change in solar radiation between night and day is already prepare. Therefore, the power distribution control which switches between the power supply sources depending on the amount of the power demanded by the devices is performed based on the variation in the power capacity of the solar cells 3 and the secondary battery 5. Furthermore, the control part 7 performs the power saving control operation as in the first embodiment, based on the results of the power distribution control.

The control part 7 may include a power distribution control unit 7b which switches between the power supply sources based on both the amount of the power supplied from each of the power supply sources and the amount of the power demanded by the devices. In this case, the control part 7 monitors the power generated by the solar cells 3, the power charged in the secondary battery 5 and the amount of the demanded power, and maintains the balance between the demand and supply of power in the relationship of "the amount of the supplied power the amount of the demanded power". Herein, the power distribution control is performed such that the solar cells 3 and the secondary battery 5 are used as power supply sources as much as possible and the commercial power source AC as little as possible.

In the above embodiments, the control part 7 includes both the power distribution control unit 7a (power distribution control means which changes the ratio of the outputs among the power supply sources) which switches between the power supply source used to supply the power to the devices L (the AC devices La and the DC devices Ld) based on the amount of the power supplied from each of the power supply sources; and the power saving control unit 7c which performs the power saving control on the operation of the devices L based on the power supply source in use. However, the devices L may include the power saving control unit 7c, and the power saving control unit provided in the devices L may obtain information about the switching of the power supply source by the power distribution control unit 7b from the control part 7 and perform the power saving control based on the information.

In the above embodiments, there is illustrated the power supply system which includes both the AC power supply lines Wa supplying the power to the AC devices La operated by the AC power and the DC power supply lines Wd supplying the power to the DC devices Ld operated by the DC power. However, even though the power supply system includes either the AC power supply lines Wa or the DC power supply lines Wd, the power saving control may be performed in conjunction with switching between the power supply sources.

Further, the present invention may be applied to the power supply system which includes one of the solar cells 3 and the secondary battery 5, and the commercial power source AC. Alternatively, the present invention may be applied to the power supply system which includes only the solar cells 3 and the secondary battery 5 as the power supply sources.

While the invention has been shown and described with respect to the embodiments, it will be understood by those skilled in the art that various changes and modifications may be made without departing from the scope of the invention as defined in the following claims.

What is claimed is:

1. A system for controlling a supply of electric power, comprising:
   a plurality of electric power sources;
   one or more electrical devices; and
   a control part, wherein the control part provides a plurality of power distribution control modes that control distribution of electric power from one or more of the electric power sources to said one or more electrical devices, each of the power distribution control modes using one or more of the electric power sources as a power source combination for said one or more electrical devices,
   wherein the control part is configured to control an operation of each electrical device based on one of at least two control patterns,
   wherein each of the at least two control patterns is configured to allow said each electrical device to operate while consuming different amounts of electric power from each other,
   wherein the electric power sources include a commercial power source, a distributed power source, and a secondary battery which is rechargeable by at least one of the commercial power source and the distributed power source,
   wherein the control part includes:
      a power distribution control unit configured to perform a power distribution control by determining one of the power distribution control modes based on at least one of conditions including an amount of electric power suppliable from the electric power sources and an amount of electric power demanded by said one or more electrical devices, and by switching the electric power sources based on a result of the determination; and
      a power saving control unit configured to perform a power saving control by changing the control patterns for each electrical device in accordance with said one of the power distribution control modes determined by the power distribution control unit, so that a power consumption of each electrical device varies depending on said at least one of the conditions,
   wherein the power distribution control modes include a mode using only the commercial power source as the power source combination, and
   wherein, the control patterns are set in association with the power distribution control modes such that when the power distribution control unit operates in the mode using only the commercial power source, the power consumption is smaller than when one or more of the electric power sources other than the commercial power source are used as the power source combination.

2. The system of claim 1, wherein the distributed power source includes solar cells,
   wherein the power distribution control modes further includes:
      a mode using only the solar cells as the power source combination; and
      a mode using the solar cells and the secondary battery as the power source combination, and
   wherein the control patterns are set in association with the power distribution control modes such that:
      when the commercial power source is used as the power source combination, the power consumption is smaller than when the power distribution control unit operates in the mode using the solar cells and the secondary battery; and
      when the power distribution control unit operates in the mode using the solar cells and the secondary battery, the power consumption is smaller than when the power distribution control unit operates in the mode using only the solar cells.

3. The system of claim 2, wherein the power distribution control modes further include:
   a mode using the solar cells, the secondary battery, and the commercial power source; and
   a mode using the solar cells and the commercial power source, and
   wherein the power saving control unit uses a control pattern whose amount of a reduction in the power consumption is set to zero when the power distribution control unit operates in the mode using only the solar cells, uses a control pattern whose amount of the reduction in the power consumption is set to a maximum value when the power distribution control unit operates in the mode using only the commercial power source, and uses a control pattern whose amount of the reduction in the power consumption to a value larger than zero and smaller than the maximum value when the power distribution control unit operates in one of the mode using the solar cells and the secondary battery, the mode using the solar cells, the secondary battery, and the commercial power source, and the mode using the solar cells and the commercial power source.

4. The system of claim 1, wherein at least two of the power distribution control modes use different power source combinations from each other.

5. The system of claim 1, wherein the control part further includes a manipulation unit for allowing a user to set an intensity of the power saving control performed by the power saving control unit, and
   wherein the power saving control unit sets the control patterns based on the intensity of the power saving control set by the user.

6. The system of claim 1, wherein the conditions further include a current time period throughout the day, and
wherein the control patterns are set in association with the power distribution control modes such that while the commercial power source is used as the power source combination, the power consumption of each electrical device varies depending on a unit electricity price of the commercial power source at the current time period.

7. The system of claim 1, wherein the power saving control unit changes the power consumption before the electric power sources are switched.

8. The system of claim 1, wherein the control patterns further include a control pattern which allows said each electrical device to operate while consuming a larger amount of electric power compared to said at least two control patterns, and a control pattern which causes said each electrical device to be turned off.

9. A control device for controlling a supply of electric power from a plurality of electric power sources to one or more electrical devices, the control device comprising:
a control unit,
wherein the control unit provides a plurality of power distribution control modes that control distribution of electric power from one or more of the electric power sources to said one or more electrical devices, each of the power distribution control modes using one or more of the electric power sources as a power source combination for said one or more electrical devices,
wherein the control part is configured to control an operation of each electrical device based on one of at least two control patterns,
wherein each of the at least two control patterns is configured to allow said each electrical device to operate while consuming different amounts of electric power from each other,
wherein the electric power sources include a commercial power source, a distributed power source, and a secondary battery which is rechargeable by at least one of the commercial power source and the distributed power source,
wherein the control unit includes:
a power distribution control unit configured to perform a power distribution control by determining one of the power distribution control modes based on at least one of conditions including an amount of electric power suppliable from the electric power sources and an amount of electric power demanded by said one or more electrical devices, and by switching the electric power sources based on a result of the determination; and
a power saving control unit configured to perform a power saving control by changing the control patterns for each electrical device in accordance with said one of the power distribution control modes determined by the power distribution control unit, so that a power consumption of each electrical device varies depending on said at least one of the conditions,
wherein the power distribution control modes include a mode using only the commercial power source as the power source combination, and
wherein, the control patterns are set in association with the power distribution control modes such that when the power distribution control unit operates in the mode using only the commercial power source, the power consumption is smaller than when one or more of the electric power sources other than the commercial power source are used as the power source combination.

10. The control device of claim 9, wherein the distributed power source includes solar cells,
wherein the power distribution control modes further includes:
a mode using only the solar cells as the power source combination; and
a mode using the solar cells and the secondary battery as the power source combination, and
wherein the control patterns are set in association with the power distribution control modes such that:
when the commercial power source is used as the power source combination, the power consumption is smaller than when the power distribution control unit operates in the mode using the solar cells and the secondary battery; and
when the power distribution control unit operates in the mode using the solar cells and the secondary battery, the power consumption is smaller than when the power distribution control unit operates in the mode using only the solar cells.

11. The control device of claim 10, wherein the power distribution control modes further include:
a mode using the solar cells, the secondary battery, and the commercial power source; and
a mode using the solar cells and the commercial power source, and
wherein the power saving control unit uses a control pattern whose amount of a reduction in the power consumption is set to zero when the power distribution control unit operates in the mode using only the solar cells, uses a control pattern whose amount of the reduction in the power consumption is set to a maximum value when the power distribution control unit operates in the mode using only the commercial power source, and uses a control pattern whose amount of the reduction in the power consumption to a value larger than zero and smaller than the maximum value when the power distribution control unit operates in one of the mode using the solar cells and the secondary battery, the mode using the solar cells, the secondary battery, and the commercial power source, and the mode using the solar cells and the commercial power source.

12. The control device of claim 9, wherein at least two of the power distribution control modes use different power source combinations from each other.

13. The control device of claim 9, wherein the control unit further includes a manipulation unit for allowing a user to set an intensity of the power saving control performed by the power saving control unit, and
wherein the power saving control unit sets the control patterns based on the intensity of the power saving control set by the user.

14. The control device of claim 9, wherein the conditions further include a current time period throughout the day, and
wherein the control patterns are set in association with the power distribution control modes such that while the commercial power source is used as the power source combination, the power consumption of each electrical device varies depending on a unit electricity price of the commercial power source at the current time period.

15. The control device of claim 9, wherein the power saving control unit changes the power consumption before the electric power sources are switched.

16. The control device of claim 9, wherein the control patterns further include a control pattern which allows said each electrical device to operate while consuming a larger amount of electric power compared to said at least two control patterns, and a control pattern which causes said each electrical device to be turned off.

\* \* \* \* \*